United States Patent [19]

Ellis et al.

[11] 4,088,501
[45] May 9, 1978

[54] PHOTOCHROMIC ALUMINO-PHOSPHATE GLASSES

[75] Inventors: Edric Ellis, Ormskirk; Richard Gelder, Preston; Allan Hale, Upholland, near Wigan, all of England

[73] Assignee: Pilkington Brothers Limited, Merseyside, England

[21] Appl. No.: 764,314

[22] Filed: Jan. 31, 1977

[30] Foreign Application Priority Data

Jan. 30, 1976 United Kingdom ............... 3813/76

[51] Int. Cl.² .................. C03C 3/26; C03C 3/10; C03C 3/04
[52] U.S. Cl. ........................... 106/52; 106/53; 106/DIG. 6
[58] Field of Search ............... 106/53, 52, DIG. 6

[56] References Cited

U.S. PATENT DOCUMENTS 3,615,761  10/1971  Sakka et al. ............ 106/DIG. 6
3,876,436  4/1975  Lythgoe .................. 106/DIG. 6

Primary Examiner—Winston A. Douglas
Assistant Examiner—Mark Bell

Attorney, Agent, or Firm—Sughrue, Rothwell, Mion, Zinn and Macpeak

[57] ABSTRACT

Fast-response photochromic boron-free aluminophosphate glasses which have silver halide crystals dispersed throughout the glass comprise, in weight percentages:

| | |
|---|---|
| $SiO_2$ | 10 to 17% |
| $Al_2O_3$ | 20 to 29% |
| $P_2O_5$ | 30 to 40% |
| $R_2O$ | 8.5 to 17% |
| $R'O$ | 4 to 18% | where $R_2O$ represents $Na_2O$ and/or $K_2O$; $R'O$ represents CaO and/or BaO, the CaO content being at least 4% if BaO is absent and being from 0 to 7% if BaO is present, while the BaO content is from 0 to 18%; the total of $SiO_2 + Al_2O_3 + P_2O_5$ amounting to not less than 69% by weight of the glass. Preferably the total of $SiO_2 + P_2O_5 + Al_2O_3$ is not less than 72% by weight of the glass. The silver content of the glass, expressed as $Ag_2O$, is preferably not less than 0.05%. Refractive index $n_D$ can be corrected to the standard ophthalmic value of 1.523 by additions of $TiO_2$, $ZrO_2$ and/or PbO.

8 Claims, No Drawings

PHOTOCHROMIC ALUMINO-PHOSPHATE GLASSES

BACKGROUND OF THE INVENTION

1. Field of the Invention

This invention relates to photochromic glasses, i.e. to glass compositions which darken on exposure to actinic radiation and fade back to their original, normally colourless, state when no longer exposed.

2. Description of the Prior Art

In our British patent specification No. 1367903, we have described and claimed a range of photochromic glasses comprising at least 17% by weight $P_2O_5$ as one of the glass forming components, with silver halide crystals dispersed throughout the glass, the total silver content of the glass being at least 0.05% by weight Ag. The specific glasses disclosed in that Specification are alumino-phosphate glasses comprising not more than 40% by weight $SiO_2$ and between 9% and 34% by weight $Al_2O_3$ as further glass forming components, and at least 10% by weight $R_2O$, where R = K, Na or Li. They can also contain up to 19% by weight $B_2O_3$ though most of them contain no more than 3% to 7% $B_2O_3$ and some contain none at all.

Glasses falling within the scope of British Pat. No. 1367903 are now used in the manufacture of ophthalmic lenses for both sunglasses and prescription spectacles. These alumino-phosphate glasses, like the photochromic borosilicate glasses which are also available on the market, exhibit desirable photochromic properties but have relatively slow responses to exposure to, and removal of, actinic radiation, i.e. slow darkening and fading rates. It is desirable, particularly for ophthalmic purposes, to have glasses with faster responses, particularly a faster fading rate. A rapid fading rate is desirable to aid in adjustment to a rapid decrease in available light, as when a wearer of spectacles with lenses of photochromic glass enters a dimly-lit room.

SUMMARY OF THE INVENTION

An object of the present invention is to provide a range of photochromic alumino-phosphate glasses having improved properties and, in particular, which provide an improved combination of photochromic effect, measured as the induced optical density or change in light transmission when irradiated with actinic radiation, and speed of response to irradiation or removal of radiation.

According to the present invention, a photochromic, boron-free alumino-phosphate glass having silver halide crystals dispersed throughout the glass comprises, in weight percentages:

| | |
|---|---|
| $SiO_2$ | 10 to 17% |
| $Al_2O_3$ | 20 to 29% |
| $P_2O_5$ | 30 to 40% |
| $R_2O$ | 8.5 to 17% |
| $R'O$ | 4 to 18% | where $R_2O$ represents $Na_2O$ and/or $K_2O$; $R'O$ represents CaO and/or BaO, the CaO content being at least 4% if BaO is absent and being from 0 to 7% if BaO is present, while the BaO content is from 0 to 18%; the total of $SiO_2 + Al_2O_3 + P_2O_5$ amounting to not less than 69% by weight of the glass. Preferably the total of $SiO_2 + P_2O_5 + Al_2O_3$ is not less than 72% by weight of the glass. In general, the silver content of the glass, expressed as $Ag_2O$, is not less than 0.05% by weight, because with lower amounts of $Ag_2O$ it can be difficult to achieve adequate darkening. Preferably the $Ag_2O$ is not less than 0.07%.

A good combination of induced optical density on irradiation with actinic light, and rapid darkening and fading rates on initiation and cessation of irradiation, can be obtained with such glasses. It will be understood that, as a general rule, darkening and fading times are longer when the induced optical density is greater.

For ophthalmic use, it is convenient for the glass to have a refractive index ($n_D$), measured for light of the wavelength of the sodium D line, which is as close as possible to the standard figure of 1.523. To adjust the refractive index to this figure, addition of proportions of $TiO_2$, $ZrO_2$ and/or PbO can be of value, though care is needed to avoid problems arising from too large a quantity of one or more of these components. The amount of $TiO_2$ used should not exceed 6% by weight, in order to avoid dangers of crystallisation and unwanted colouration of the glass, the normal preferred limit being 3% by weight. $ZrO_2$ should not exceed 10 weight % in order to avoid unacceptable increases in liquidus temperature, the normal preferred limit being 7 weight %. PbO can be incorporated in quantities up to 4% by weight, though the normal preferred limit is 1.5% by weight. Minor amounts of other additives may be incorporated. For example, up to 3% $CeO_2$ may be included. Tinting agents may also be included in known manner, to provide a fixed tint in addition to the variable photochromic colouring.

As is known, the photochromic effect is produced by the silver halide crystals referred to above. Minor amounts of copper oxides, and possibly of other reducing oxides such as $As_2O_3$, assist the development of the photochromic effect, and larger amounts of CuO may be used to provide a fixed tinting effect in addition. The preferred amounts of the photochromic components, namely the silver (expressed as $Ag_2O$), the copper oxide and the halides (Cl and Br), which are expressed in accordance with the normal convention as quantities over and above the 100% total of all other components of the glass, are as follows:

| | |
|---|---|
| $Ag_2O$ | 0.07 to 0.35% |
| CuO | 0.005 to 1.0% |
| Cl + Br | 0.4 to 2.0% |
| Cl | 0 to 1.0% |
| Br | 0.20 to 1.0% |

In most cases, the photochromic effect can be enhanced by heat treatment of the glass, the appropriate heat treatment schedule being primarily determined by the viscosity-temperature relationship of the particular glass. In general, the heat treatment temperature lies between the strain point and the softening point of the glass, the heat treatment time required being several hours at the lower temperature but only a few minutes at the higher temperature. At the higher temperature, however, deformation and clouding of the glass may occur, so it is preferred for convenience to use a temperature 20° to 100° C above the annealing point and a heat treatment time of 10 to 60 minutes.

The schedule may be imposed on the glass directly after forming or the glass may be annealed and cooled to room temperature before heat treatment. The cooling rate to which the glass is subjected after heat treatment is sometimes found to have an effect on the photochromic properties of the final product. This cannot be stated as a general rule however and must be determined by experimentation on individual glasses.

The temperature/time schedule imposed on a glass is also determined by the concentrations of photochromic agents in the glass and the photochromic property requirements of the final product. In general, the higher the levels of the components contributing to the photochromism the shorter will be the heat treatment schedule and in some cases, the photochromism may develop during cooling from the melt or annealing of the glass. Excessively long heat treatments are generally to be avoided, because they may lead to some clouding of the glass.

DETAILED DESCRIPTION OF THE INVENTION

Specific embodiments of the invention will now be described in more detail by way of example, and with reference to the following table, which sets out examples of glass compositions in accordance with the invention, showing their compositions on the oxide basis and the photochromic effect achieved in terms of the induced optical density (ODd) and the time in seconds taken to fade to a condition of half the total induced optical density (½ OD FT), measured with standard samples of glass 2 mm thick, in standard simulated solar conditions at air mass 2 (see Parry Moon, J. Franklin Inst., 230 (1940), pages 583–617). The induced optical density is the difference between the optical density of the glass in the fully darkened state and the optical density in the fully faded state, the optical density being defined in the conventional manner as $\log_{10} I_i/I_t$, where $I_i$ is the intensity of the incident light and $I_t$ is the intensity of the transmitted light. The induced optical density is thus a real measure of the photochromic effect and is in fact directly proportional to the number of photochromically activated silver atoms in a given volume of the glass. The time required to fade from the fully darkened condition to a condition of half the induced optical density (½ OD FT) is thus an effective measure for comparing fading times of glasses having different values of light transmission in the bleached or faded state.

The table also lists the temperature (HT° C) at which each of the glasses was heat treated. A standard heat treatment time of 20 minutes was used in each case, for comparative purposes only.

Finally the table lists the refractive index $n_D$ of each of the glasses

| Wt% | Glass No. | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| $SiO_2$ | | 10.3 | 10.5 | 11.0 | 13.0 | 13.9 | 10.5 | 10.7 | 10.1 | 10.0 | 10.5 | 10.7 | 10.7 | 10.1 | 10.5 | 10.0 | 10.3 | 10.5 |
| $Al_2O_3$ | | 27.3 | 27.7 | 29.1 | 26.5 | 25.5 | 27.9 | 28.4 | 26.2 | 27.7 | 28.2 | 26.9 | 21.8 | 25.5 | 27.5 | 27.8 | | |
| $P_2O_5$ | | 36.5 | 37.1 | 39.0 | 35.4 | 33.9 | 37.3 | 38.1 | 35.8 | 35.1 | 37.1 | 37.8 | 37.8 | 35.9 | 37.3 | 36.3 | 36.5 | 37.1 |
| $B_2O_3$ | | | | | | | | | | | | | | | | | | |
| $Na_2O$ | | 6.1 | 6.3 | 6.5 | 6.0 | 6.4 | 6.3 | 6.4 | 6.0 | 5.9 | 5.6 | 5.0 | 5.0 | 6.7 | 5.0 | 6.0 | 4.9 | 4.3 |
| $K_2O$ | | 9.2 | 9.4 | 9.9 | 9.0 | 9.6 | 9.4 | 9.6 | 9.1 | 8.9 | 8.4 | 7.5 | 7.5 | 10.1 | 7.4 | 9.0 | 7.3 | 6.4 |
| CaO | 4.1 | 4.1 | | 4.3 | 4.0 | 4.3 | 5.4 | 6.7 | 2.9 | 1.7 | 4.1 | 4.2 | 4.2 | 4.0 | 4.2 | 4.0 | 4.1 | 4.2 |
| BaO | 6.3 | | | 6.1 | 6.5 | 3.2 | | | 9.3 | 12.2 | 6.4 | 6.5 | 6.5 | 6.2 | 6.5 | 6.1 | 6.3 | 6.4 |
| PbO | | | 1.5 | | | | | | | | | | | | | | | |
| $TiO_2$ | | | 1.3 | | | | | | | | | | | | | 1.2 | 1.2 | 1.3 |
| $ZrO_2$ | | | 2.1 | | | | | | | | | | | 7.30 | 2.0 | 2.1 | 2.1 |
| $CeO_2$ | | | | | | | | | | | | | | | | | | |
| $Ag_2O$ | | .13 | .12 | .14 | .13 | .12 | .12 | .12 | .14 | .13 | .11 | .13 | .13 | .13 | .12 | .12 | .10 | .033 |
| CuO | | .036 | .032 | .032 | .032 | .032 | .031 | .033 | .033 | .031 | .033 | .032 | .041 | .032 | .034 | .056 | .032 | 0.33 |
| Cl | | .33 | .35 | .29 | .51 | .45 | .46 | .41 | .35 | .44 | .45 | .43 | .38 | .38 | .56 | .29 | .51 | .58 |
| Br | | .41 | ..51 | .36 | .42 | .39 | .42 | .38 | .38 | .44 | .42 | .58 | .40 | .37 | .51 | .28 | .54 | .38 |
| ODd | | .477 | .448 | .409 | .338 | .450 | .381 | .428 | .459 | .428 | .377 | .271 | .206 | .516 | .262 | .437 | .264 | .244 |
| ½ OD FT | | 15 | 89 | 41 | 18 | 66 | 27 | 70 | 45 | 44 | 20 | 8.5 | 8 | 47 | 22.5 | 12 | 6 | 8 |
| HT° C | | 625 | 620 | 620 | 630 | 580 | 600 | 582 | 580 | 580 | 630 | 630 | 630 | 50 | 710 | 630 | 620 | 665 |
| $n_D$ | | 1.506 | 1.506 | 1.495 | 1.508 | 1.511 | 1.506 | 1.502 | 1.512 | 1.513 | 1.506 | 1.509 | 1.509 | 1.507 | 1.530 | 1.521 | 1.521 | 1.522 |

| Wt% | Glass No. | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|
| $SiO_2$ | | 10.8 | 10.8 | 10.5 | 10.1 | 10.0 | 10.8 | 10.0 | 10.0 | 10.0 | 10.2 | 10.0 | 10.2 | 10.7 | 10.0 | 10.0 | 10.0 |
| $Al_2O_3$ | | 28.7 | 28.5 | 27.9 | 26.7 | 26.2 | 22.4 | 25.3 | 26.2 | 24.3 | 25.1 | 25.3 | 27.1 | 28.2 | 25.5 | 25.5 | 25.5 |
| $P_2O_5$ | | 38.4 | 38.2 | 37.3 | 35.8 | 35.0 | 38.2 | 33.8 | 34.9 | 37.9 | 39.1 | 36.1 | 36.3 | 37.8 | 36.3 | 36.3 | 36.3 |
| $B_2O_3$ | | | | | | | | | | | | | | | | | |
| $Na_2O$ | | 4.4 | 6.4 | 6.3 | 6.0 | 5.9 | 5.1 | 5.7 | 4.7 | 5.9 | 4.8 | 6.0 | 4.9 | 5.0 | 6.0 | 6.0 | 6.0 |
| $K_2O$ | | 6.6 | 9.7 | 9.5 | 9.1 | 8.9 | 7.6 | 8.6 | 7.0 | 8.9 | 7.2 | 9.0 | 7.3 | 7.5 | 9.0 | 9.0 | 9.0 |
| CaO | | 4.3 | 3.1 | 3.6 | 4.6 | 5.0 | 4.3 | 4.9 | 5.1 | 3.9 | 4.1 | 4.0 | 4.1 | 4.2 | 4.0 | 4.0 | 4.0 |
| BaO | | 6.6 | 3.4 | 4.9 | 7.7 | 9.0 | 6.6 | 8.8 | 9.1 | 6.0 | 6.3 | 6.1 | 6.3 | 6.5 | 6.1 | 6.1 | 6.1 |
| PbO | | | | | | | | | | | | | | | | | |
| TiO | | | | | | | | 1.2 | 1.2 | 1.2 | 1.2 | 1.2 | 1.2 | | 1.2 | 1.2 | 1.2 |
| $ZrO_2$ | | | | | | | 5.0 | 1.9 | 2.0 | 2.0 | 2.0 | 2.0 | 2.0 | | 2.0 | 2.0 | 2.0 |
| $CeO_2$ | | | | | | | | | | | | 0.5 | 0.5 | | | | |
| $Ag_2O$ | | .14 | .11 | .13 | .14 | .11 | .132 | .11 | .11 | .13 | .15 | .14 | .12 | .33 | .19 | .15 | .13 |
| CuO | | .037 | .035 | .040 | .043 | .040 | .042 | .035 | .038 | .043 | .044 | .039 | .043 | .054 | .038 | .045 | .071 |
| Cl | | .38 | .49 | .29 | .41 | .33 | .38 | .42 | .43 | .49 | .42 | .44 | .40 | .31 | .54 | .36 | .44 |
| Br | | .36 | .34 | .32 | .40 | .32 | .45 | .42 | .41 | .49 | .44 | .41 | .39 | .24 | .38 | .26 | .44 |
| ODd | | .228 | .276 | .337 | .398 | .304 | .313 | .305 | .251 | .345 | .248 | .322 | .242 | .513 | .450 | .477 | .48 |
| ½ OD FT | | 8 | 25 | 20 | 20 | 25 | 10 | 15 | 30 | 21 | 12 | 12 | 12 | 42 | 25 | 35 | 20 |
| HT° C | | 665 | 630 | 610 | 610 | 630 | 610 | 625 | 625 | 635 | 615 | 635 | 615 | 662 | 625 | 645 | 610 |
| $n_D$ | | 1.510 | 1.501 | 1.505 | 1.513 | 1.516 | 1.524 | 1.527 | 1.525 | 1.521 | 1.521 | 1.521 | 1.521 | 1.509 | 1.521 | 1.521 | 1.521 |

| Wt% | Glass No. | 34 | 35 | 36 | 37 | 38 | 39 | 40 | 41 | 42 | 43 | 44 | 45 | 46 | 47 | 48 | 49 |
|---|---|---|---|---|---|---|---|---|---|---|---|---|---|---|---|---|---|
| $SiO_2$ | | 10.3 | 10.3 | 10.3 | 10.3 | 10.3 | 10.3 | 10.3 | 10.0 | 10.0 | 10.0 | 10.0 | 10.0 | 10.0 | 10.0 | 10.0 | 10.5 |
| $Al_2O_3$ | | 27.3 | 27.3 | 27.3 | 27.3 | 27.3 | 27.3 | 27.3 | 25.5 | 25.4 | 25.4 | 25.3 | 25.5 | 25.5 | 25.5 | 25.5 | 26.3 |
| $P_2O_5$ | | 36.5 | 36.5 | 36.5 | 36.5 | 36.5 | 36.5 | 36.5 | 36.3 | 36.2 | 36.2 | 36.0 | 36.3 | 36.3 | 36.3 | 36.3 | 36.7 |
| $B_2O_3$ | | | | | | | | | | | | | | | | | |
| $Na_2O$ | | 4.9 | 4.9 | 4.9 | 4.9 | 4.9 | 4.9 | 4.9 | 6.0 | 6.0 | 6.0 | 6.0 | 6.0 | 6.0 | 6.0 | 6.0 | |
| $K_2O$ | | 7.3 | 7.3 | 7.3 | 7.3 | 7.3 | 7.3 | 7.3 | 9.0 | 9.0 | 9.0 | 8.9 | 9.0 | 9.0 | 9.0 | 9.0 | 8.5 |
| CaO | | 4.1 | 4.1 | 4.1 | 4.1 | 4.1 | 4.1 | 4.1 | 4.0 | 4.0 | 4.0 | 4.0 | 4.0 | 4.0 | 4.0 | | |
| BaO | | 6.3 | 6.3 | 6.3 | 6.3 | 6.3 | 6.3 | 6.3 | 6.1 | 6.1 | 6.1 | 6.1 | 6.1 | 6.1 | 6.1 | 6.1 | 18.0 |
| PbO | | | | | | | | | | 0.2 | 0.4 | 0.6 | | | | | |
| $TiO_2$ | | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | |
| $ZrO_2$ | | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |

-continued

| | | | | | | | | | | | | | | | |
|---|---|---|---|---|---|---|---|---|---|---|---|---|---|---|---|
| CeO$_2$ | | | | | | | | | | | As$_2$O$_3$ | 0.1 | | | |
| Ag$_2$O | .21 | .27 | .13 | .20 | .24 | .24 | .24 | .18 | 0.12 | 012 | 0.12 | .13 | .12 | .13 | .095 | .012 |
| CuO | .036 | .045 | .075 | .045 | .043 | .039 | .043 | .034 | 0.036 | 0.036 | .036 | .038 | .039 | .044 | .042 | .034 |
| Cl | .41 | .23 | .36 | .27 | .34 | .24 | .44 | .43 | 0.29 | 0.29 | 0.29 | .37 | .50 | .35 | | 0.17 |
| Br | .34 | .25 | .40 | .24 | .30 | .40 | .26 | .44 | 0.28 | 0.28 | 0.44 | .41 | .31 | .97 | 0.27 | |
| ODd | .447 | .848 | .324 | .509 | .616 | .443 | .408 | .323 | .452 | .533 | .359 | .288 | .385 | .357 | .194 | |
| ½ OD TF | 40 | 75 | 6 | 20 | 42 | 8 | 36 | 27 | 30 | 50 | 170 | 15 | 12 | 42 | 27 | 13.5 |
| HT° C | 585 | 585 | 590 | 640 | 615 | 650 | 680 | 647 | 635 | 635 | 645 | 635 | 630 | 645 | 620 | 630 |
| n$_D$ | 1.522 | 1.522 | 1.522 | 1.522 | 1.522 | 1.522 | 1.522 | 1.521 | 1.521 | 1.521 | 1.521 | 1.521 | 1.521 | 1.521 | 1.521 | 1.519 |

| Wt% | Glass No. | 50 | 51 | 52 |
|---|---|---|---|---|
| SiO$_2$ | | 16.4 | 10.0 | 10.0 |
| Al$_2$O$_3$ | 23.2 | 26.2 | 25.5 | |
| P$_2$O$_5$ | 30.8 | 35.0 | 36.3 | |
| B$_2$O$_3$ | | | | |
| Na$_2$O | | 6.3 | 5.9 | 6.0 |
| K$_2$O | | 9.5 | 8.9 | 9.0 |
| CaO | | 4.2 | | 4.0 |
| BaO | | 6.4 | 13.9 | 6.1 |
| PbO | | | | |
| TiO$_2$ | | 1.4 | | 1.2 |
| ZrO$_2$ | | 2.0 | | 2.0 |
| CeO$_2$ | | | | |
| Ag$_2$O | | .12 | .13 | .07 |
| CuO | | .040 | .037 | .041 |
| Cl | | .56 | .57 | .56 |
| Br | | .45 | .53 | .53 |
| ODd | | .398 | .294 | .262 |
| ½ OD FT | | 38 | 27 | 32 |
| HT° C | | 625 | 625 | 625 |
| n$_D$ | | 1.521 | 1508 | 1.521 |

The compositions listed in the Table can be made up in the following manner. The batch is melted under oxidising or neutral conditions at a temperature in the range 1200° to 1600° C, and after cooling is annealed at a temperature between 450° and 650° C. A final heat treatment may subsequently be effected at between 20° and 100° C above the annealing point for a period of 10 to 60 minutes. The optimum heat treatment temperature range for a particular glass may be determined by a gradient furnace technique. In some cases, it may be necessary to support the glass during heat treatment to avoid sagging.

The batches can be made up from conventional glass-making raw materials, such as carbonates, meta- or ortho-phosphates, nitrates and oxides. The silver and halide components may be added to the batches in the form of finely-ground silver salts and sodium or potassium halides, respectively.

Precautions are required during melting to minimise volatilisation losses of batch components. Up to 60% by weight of the halide components and 30% by weight of the silver may be lost in this way and the necessary allowances are required during batch preparation.

The glasses have a useful combination of photochromic effect, measured as induced optical density, with speed of response to exposure to, or removal of, actinic radiation. Although in some glasses it will be seen that the induced optical density is not high, the speed of response in those glasses is particularly rapid. The glasses can be used for ophthalmic purposes and for other applications where temporary protection from actinic radiation such as sunlight is required with a return to normal transmission when the actinic radiation is absent. They may thus be used for glazing in buildings or vehicles in some circumstances.

We claim:

1. A photochromic boron-free alumino-phosphate glass having silver halide crystals dispersed throughout the glass, the glass comprising, in weight percentages:

| | |
|---|---|
| SiO$_2$ | 10 to 17% |
| Al$_2$O$_3$ | 20 to 29% |
| P$_2$O$_5$ | 30 to 40% |
| R$_2$O | 8.5 to 17% |
| R'O | 4 to 18% | where R$_2$O represents Na$_2$O and/or K$_2$O; R'O represents CaO and/or BaO, the CaO content being at least 4% if BaO is absent and being from 0 to 7% if BaO is present, while the BaO content is from 0 to 18%; the total of SiO$_2$ + Al$_2$O$_3$ + P$_2$O$_5$ amounting to not less than 69% by weight of the glass; and, in weight percentages, expressed as quantities over and above the 100% total of all other components:

| | |
|---|---|
| Ag$_2$O | 0.07 to 0.35% |
| CuO | 0.005 to 1.0% |
| Cl + Br | 0.4 to 2.0% |
| Cl | 0 to 1.0% |
| Br | 0.20 to 1.0%. |

2. A glass according to claim 1, wherein the total of SiO$_2$ + P$_2$O$_5$ + Al$_2$O$_3$ is not less than 72% by weight of the glass.

3. A glass according to claim 1, further comprising TiO$_2$ in an amount of up to 6% by weight, the amount of TiO$_2$ constituting part of the said 100% total of all other components.

4. A glass according to claim 3, wherein the TiO$_2$ content does not exceed 3% by weight.

5. A glass according to claim 1, further comprising ZrO$_2$ in an amount of up to 10% by weight, the amount of ZrO$_2$ constituting part of the said 100% total of all other components.

6. A glass according to claim 5, wherein the ZrO$_2$ content does not exceed 7% by weight.

7. A glass according to claim 1, further comprising PbO in an amount of up to 4% by weight, the amount of PbO constituting part of the said 100% total of all other components.

8. A glass according to claim 7, wherein the PbO content does not exceed 1.5% by weight.

* * * * *